US012338775B2

(12) United States Patent
Czapla et al.

(10) Patent No.: US 12,338,775 B2
(45) Date of Patent: Jun. 24, 2025

(54) PROPULSION ASSEMBLY FOR AN AIRCRAFT

(71) Applicant: Airbus Operations SAS, Toulouse (FR)

(72) Inventors: Lionel Czapla, Toulouse (FR); Emmanuel Vardelle, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 18/438,887

(22) Filed: Feb. 12, 2024

(65) Prior Publication Data

US 2024/0271573 A1 Aug. 15, 2024

(30) Foreign Application Priority Data

Feb. 14, 2023 (FR) ..................... 2301354

(51) Int. Cl.
| | | |
|---|---|---|
| *F02C 7/22* | (2006.01) | |
| *B64D 27/12* | (2006.01) | |
| *B64D 37/30* | (2006.01) | |
| *F02C 7/32* | (2006.01) | |
| *F02K 3/02* | (2006.01) | |
| *B64D 29/08* | (2006.01) | |

(52) U.S. Cl.
CPC ............... *F02C 7/32* (2013.01); *B64D 27/12* (2013.01); *B64D 37/30* (2013.01); *F02C 7/22* (2013.01); *F02K 3/02* (2013.01); *B64D 29/08* (2013.01)

(58) Field of Classification Search
CPC .. F02C 7/22; F02C 7/222; F02C 7/224; F01D 25/24
See application file for complete search history.

(56) References Cited

U.S. PATENT DOCUMENTS

| | | | |
|---|---|---|---|
| 4,062,184 A | 12/1977 | Hagen | |
| 4,474,346 A * | 10/1984 | Murphy | B64D 29/00 60/797 |
| 4,818,176 A | 4/1989 | Huether et al. | |
| 7,013,636 B2 * | 3/2006 | Lya | F02K 1/822 60/770 |
| 9,695,750 B2 * | 7/2017 | Wollenweber | F02C 9/40 |
| 10,066,548 B2 * | 9/2018 | Gilson | F02K 1/827 |
| 11,428,191 B1 * | 8/2022 | Alonso-Miralles | F02K 1/80 |
| 11,946,415 B2 * | 4/2024 | Rambo | F02K 1/40 |

(Continued)

FOREIGN PATENT DOCUMENTS

| | | |
|---|---|---|
| DE | 2413507 A1 | 10/1975 |
| GB | 1453873 A | 10/1976 |

OTHER PUBLICATIONS

French Search Report for corresponding French Patent Application No. 2301354 dated Aug. 23, 2023.

*Primary Examiner* — Thuyhang N Nguyen
(74) *Attorney, Agent, or Firm* — Greer, Burns & Crain, Ltd.

(57) ABSTRACT

A propulsion assembly for an aircraft having a chassis in the form of a cage with bars, a turbine, a dihydrogen supply pipe winding inside a nacelle as far as the rear of the turbine, with a radial step towards the outside of the nacelle, a rail with a radial step towards the outside of the nacelle, a bypass pipe connected between the two radial steps outside the nacelle, and a protection plate fastened to the bars, and an absorber between the protection plate and the related bar.

8 Claims, 3 Drawing Sheets

(56) References Cited

U.S. PATENT DOCUMENTS

| | | |
|---|---|---|
| 2008/0073460 A1 | 3/2008 | Beardsley et al. |
| 2017/0023013 A1* | 1/2017 | Quillent ................ F01D 25/005 |
| 2019/0270524 A1 | 9/2019 | Eichstadt |

* cited by examiner

PROPULSION ASSEMBLY FOR AN AIRCRAFT

CROSS-REFERENCES TO RELATED APPLICATIONS

This application claims the benefit of French Patent Application Number 2301354 filed on Feb. 14, 2023, the entire disclosure of which is incorporated herein by way of reference.

FIELD OF THE INVENTION

The present invention relates to a propulsion assembly for an aircraft, said propulsion assembly comprising a nacelle, a chassis seated in the nacelle, a propulsion system such as a turboprop engine seated in the chassis, a dihydrogen pipe connected to a dihydrogen tank, a dihydrogen distribution network connected to the dihydrogen pipe to supply said dihydrogen to the combustion chamber of the propulsion system via injectors, in which the distribution network includes at least one pipe winding outside the nacelle. The invention also relates to an aircraft having at least one such propulsion assembly.

BACKGROUND OF THE INVENTION

In order to move, an aircraft conventionally has at least one propulsion assembly comprising a propulsion system such as a turboprop engine. Such a propulsion system has a core that is enclosed in a casing and that has, inter alia, from upstream to downstream, a compressor, a combustion chamber and a turbine. The propulsion system also has a propeller driven in rotation by the core. The compressor and the turbine each have blades that are fastened to a rotary shaft.

The propulsion assembly also has a chassis that is fastened to a structure of the wing of the aircraft and thus constitutes an attachment pylon beneath the wing.

In order to limit pollution due to the use of kerosene, using dihydrogen as fuel in the combustion chamber is envisaged.

This dihydrogen is brought from a tank to the combustion chamber by a dihydrogen pipe that extends at least partially in the propulsion assembly. As a result of the structure of the propulsion assembly and its position beneath the wing and on the front of the wing, the dihydrogen pipe passes through the chassis, coming from the wing, and thus runs from the rear to the front as far as the combustion chamber.

To simplify such an installation, the dihydrogen pipe runs outside the casing so as to reach the combustion chamber through the casing.

In the event of an incident affecting the propulsion system, some blades of the turbine or of the compressor may be detached from the shaft and, on account of their speed, may pass through the casing, which entails a risk of cutting the dihydrogen pipe.

SUMMARY OF THE INVENTION

One objective of the present invention is to propose a propulsion assembly that includes a bypass pipe arranged about the turbine that winds about the nacelle, in which the propulsion assembly has mechanical absorption and protection means between the turbine and the bypass pipe to absorb impacts if a blade becomes detached. This protects the bypass pipe if a blade of the turbine is partially or fully broken.

To that end, a propulsion assembly for an aircraft is proposed, having:
  a chassis in the form of a cage formed by a grid of bars,
  a nacelle fastened to the chassis and formed by cowls,
  a propulsion system seated in the nacelle and including a core enclosed in a casing and having a combustion chamber and a turbine provided with blades that are rotary about a longitudinal axis, the portion of the casing containing the turbine being seated in the cage,
  a supply pipe intended to convey the dihydrogen, winding inside the nacelle as far as the rear of the turbine, and having a radial step that passes through one of the cowls to reach the outside of the nacelle,
  an injector rail seated in the nacelle, fitted with injectors that enter the combustion chamber at the front of the turbine, and having a radial step that passes through one of the cowls to reach the outside of the nacelle,
  a bypass pipe fluidically connected between the two radial steps and arranged outside the nacelle, and
  protection means comprising:
  a protection plate arranged inside the cage in relation to the bars and extending between the turbine and the bypass pipe,
  at least one fastening means provided to fasten the protection plate to a bar, and
  for each fastening means, an absorption means arranged between the protection plate and the related bar.

With this arrangement, a blade of the turbine that is detached in full or in part will not cut the bypass pipe, since it will be blocked by the protection and absorption means.

According to a specific embodiment, there is a single absorption means in the form of a plate between the protection plate and the bars.

According to a specific embodiment, there is a separate absorption means for each fastening means and each absorption means is sandwiched between the protection plate and the bar corresponding to the fastening means.

Advantageously, each absorption means has a lower compression strength on the side facing the protection plate and a higher compression strength on the side facing the bar.

Advantageously, the cowl of the nacelle arranged alongside the bypass pipe is replaced by an additional absorption means that is fastened to the chassis or to the neighboring cowls.

Advantageously, the additional absorption means has a lower compression strength on the side facing the inside of the nacelle and a higher compression strength on the side facing the outside of the nacelle.

Advantageously, the propulsion assembly comprises an outer cowl fastened to the outside of the cowls of the nacelle covering the bypass pipe, and the propulsion assembly has an air inlet at the front of the outer cowl, between the latter and the cowls of the nacelle and an outlet at the rear of the outer cowl, between the latter and the cowls of the nacelle.

The invention also proposes an aircraft having a wing, a dihydrogen tank, and at least one propulsion assembly according to one of the variants above, in which the propulsion assembly is fastened beneath the wing and in which the supply pipe is fluidically connected to the dihydrogen tank.

BRIEF DESCRIPTION OF THE DRAWINGS

The features of the invention mentioned above, along with others, will become more clearly apparent upon reading the following description of one exemplary embodiment, said description being given with reference to the appended drawings, in which.

DETAILED DESCRIPTION OF THE PREFERRED EMBODIMENTS

Figure 1:
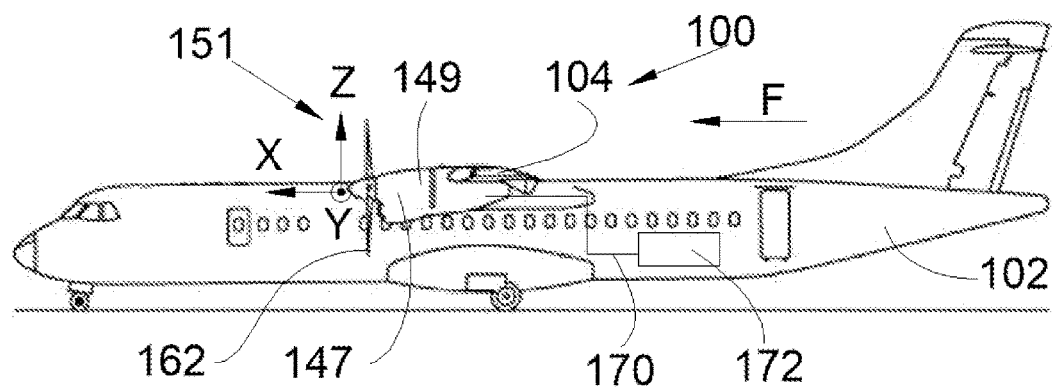
FIG. 1 is a side view of an aircraft comprising a propulsion assembly according to the invention.

In the following description, terms relating to a position are considered in relation to an aircraft in a position of forward movement, i.e. as shown in FIG. 1 in which the arrow F shows the direction of forward movement of the aircraft.

In the following description, and by convention, X denotes the longitudinal axis of the propulsion system, which is parallel to the longitudinal axis of the aircraft oriented positively towards the front in the direction of forward movement of the aircraft, Y denotes the transverse axis, which is horizontal when the aircraft is on the ground, and Z denotes the vertical axis or vertical height when the aircraft is on the ground, these three axes X, Y and Z being mutually orthogonal.

FIG. 1 shows an aircraft 100 that has a fuselage 102 with a wing 104 fastened on each side. At least one propulsion assembly 151 according to the invention, comprising a nacelle 149 made up of cowls 147 forming an aerodynamic outer surface, is fastened beneath each wing 104.

Figure 2:
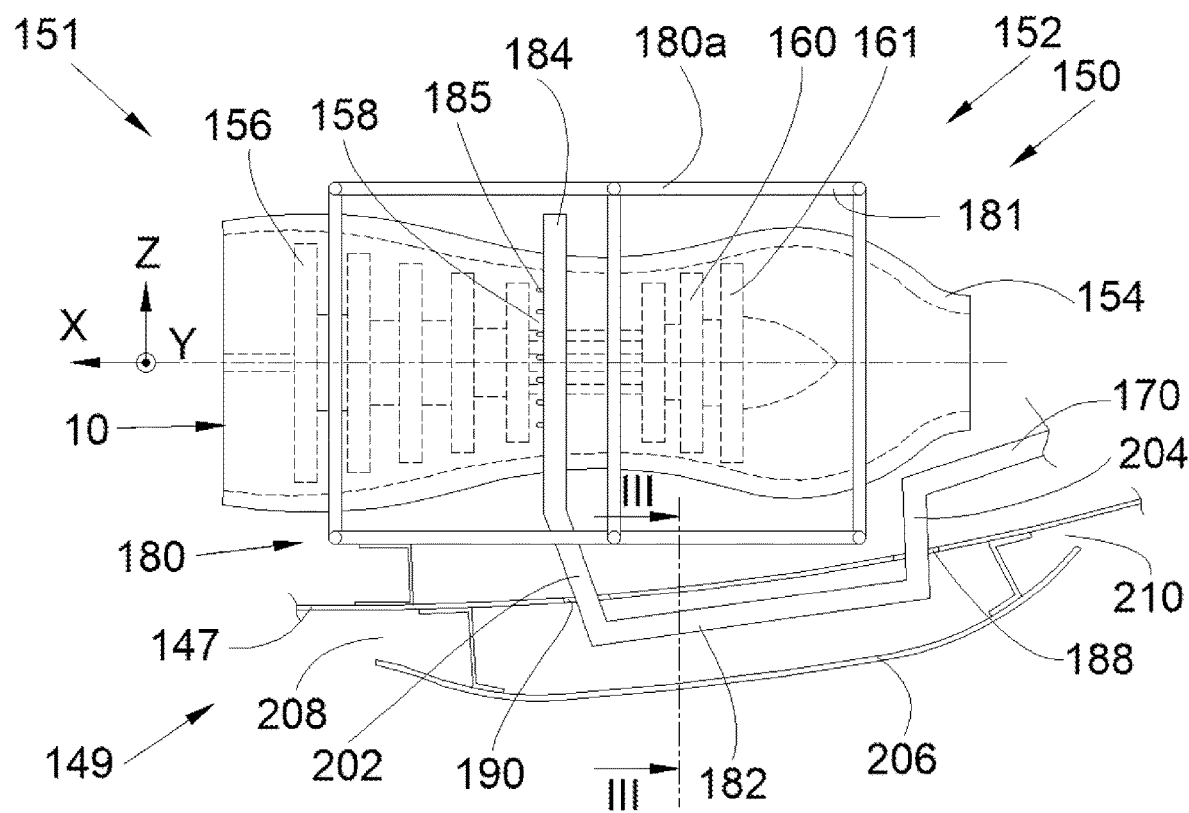
FIG. 2 is a schematic top view of the propulsion assembly according to the invention.

FIG. 2 shows the propulsion assembly 151, which also has a propulsion system 150 that is depicted schematically. The propulsion assembly 151 includes a chassis 180 that fastens the propulsion assembly 151 to a structure of the wing 104 and forms an attachment pylon. The chassis 180 takes the form of a cage 180a made of bars 181 fastened to one another such as to form a grid, in which the propulsion system 150 is at least partially seated. The chassis 180 is fastened to the structure of the wing by fastening means known to the person skilled in the art. The chassis 180 and the propulsion system 150 are seated inside the nacelle 149.

In the embodiment of the invention shown in FIG. 2, the propulsion system 150 is a turboprop engine that has a core 152 that is enclosed in a casing 154. In the embodiment of the invention shown in FIG. 2, the casing 154 is seated inside the chassis 180 forming the cage 180a and is fastened thereto by any suitable means known to the person skilled in the art.

External air enters the nacelle 149 through an opening in the cowls 147 at the front of the nacelle 149, which is also fastened to the chassis 180 by suitable fastening means known to the person skilled in the art.

Inside the nacelle 149, the primary air flow 10 enters the core 152 so as to supply a combustion chamber 158 with dioxygen.

The casing 154 is thus open at the front so as to allow the primary flow 10 to enter the core 152 and open at the rear to allow the gases resulting from combustion to be discharged through a nozzle. The core 152 has, from upstream to downstream, a compressor 156, the combustion chamber 158 and a turbine 160. The compressor 156 and the turbine 160 are provided with blades 161 that rotate about the longitudinal axis X.

The primary flow 10 thus passes successively through the compressor 156 where it is compressed before being injected into the combustion chamber 158 where it is mixed with the fuel. The gases resulting from combustion then pass through the turbine 160 and drive it in rotation. The turbine 160 then in turn drives the compressor 156 in rotation and the gases are then discharged at the rear.

In the case of a turboprop engine, the propulsion system 150 has a propeller 162 at the front that is driven in rotation by the turbine 160, possibly via a gearbox. The propeller 162 turns about an axis of rotation that is parallel to the longitudinal axis X and potentially offset therefrom.

More specifically, according to the invention, at least the portion of the casing 154 containing the turbine 160 is seated in the cage 180a.

The propulsion assembly 151 also includes a supply pipe 170 fluidically connected to a dihydrogen tank 172 of the aircraft 100 to convey the dihydrogen. The supply pipe 170 thus winds inside the nacelle 149, from the rear of the nacelle 149 outside the casing 154 as far as the rear of the turbine 160.

The propulsion assembly 151 also includes an injector rail 184 that is seated inside the nacelle 149 and in this case arranged about the casing 154 and the combustion chamber 158. The injector rail 184 is fitted with injectors 185 that enter the combustion chamber 158 at the front of the turbine 160, in this case through the casing 154.

The propulsion assembly 151 has at least one bypass pipe 182 that is fluidically connected between the supply pipe 170 and the injector rail 184.

Reference is made to one bypass pipe 182 in the remainder of the description, but the invention applies equally to each bypass pipe 182 where there are several.

The bypass pipe 182 extends along the turbine 160 between the rear of the turbine 160 and the front of the turbine 160.

The dihydrogen is thus delivered by the supply pipe 170 then passed through the bypass pipe 182 along the turbine 160 before reaching the injector rail 184, where it is injected into the combustion chamber 158 by the injectors 185.

In the event of an incident affecting the propulsion system 150, some or all of a blade 161 of the turbine 160 may be detached and pass through the casing 154, which risks cutting the bypass pipe 182 passing close to the turbine 160.

The bypass pipe 182 is arranged outside the cowls 147 of the nacelle 149.

The supply pipe 170 seated inside the cowls 147 then has a radial step 204 that passes through one of the cowls 147 to reach the outside of the nacelle 149 and the injector rail 184 also has a radial step 202 that passes through one of the cowls 147 to reach the outside of the nacelle 149. The bypass pipe 182 is then fluidically connected between the two radial steps 202 and 204 outside the nacelle 149. For this purpose, for each radial step 202, 204, a hole 188, 190 is provided in one of the cowls 147 to enable said radial step 202, 204 to pass through. Each radial step 202, 204 is overall perpendicular to the longitudinal axis X. According to one specific embodiment, the bypass pipe 182 is arranged at the top of the nacelle 149, i.e. at 12 o'clock in relation to the longitudinal axis X.

Figure 3:
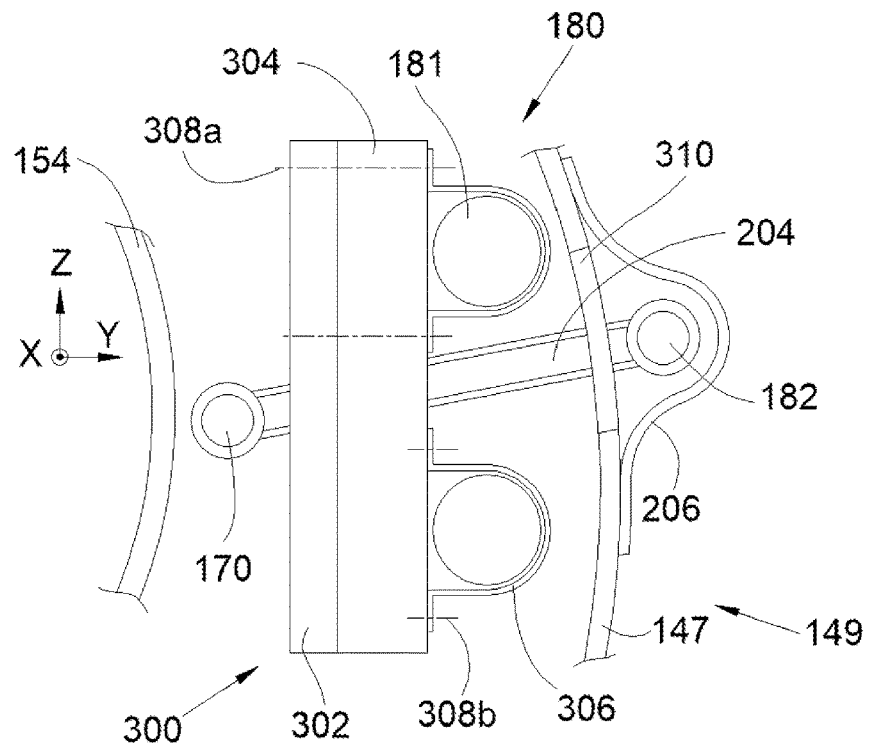
FIG. 3 is a cross section view, taken along the line III-III in FIG. 2, of a first embodiment of the invention.
Figure 4:
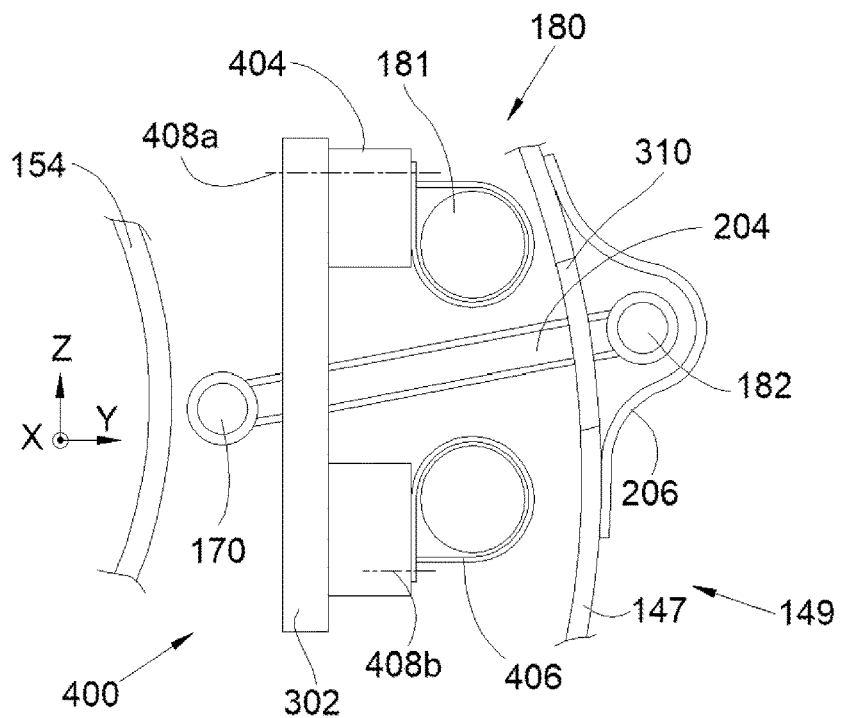
FIG. 4 is a cross section view, taken along the line III-III in FIG. 2, of a second embodiment of the invention.

FIGS. 3 and 4 are cross section views of different embodiments of the invention.

FIGS. 3 and 4 show different protection means 300, 400 arranged between the casing 154 and the bypass pipe 182 and between the turbine 160 and the bypass pipe 182. The protection means 300, 400 form a barrier between the turbine 160 and the bypass pipe 182 to block any debris from a blade 161 that has passed through the casing 154.

The protection means 300, 400 include a rigid protection plate 302 arranged between the casing 154 and the bypass pipe 182 and between the turbine 160 and the bypass pipe 182.

The protection plate 302 is arranged inside the cage 180a in relation to the bars 181.

The protection means 300, 400 also include at least one fastening means 306, 406 to fasten the protection plate 302 to a bar 181.

For each fastening means 306, 406, the protection means 300, 400 also include an absorption means 304, 404 arranged between the protection plate 302 and the bar 181 associated with the fastening means 306, 406. Each absorption means 304, 404 is also arranged inside the cage 180a in relation to the bars 181.

Each absorption means 304, 404 is designed to be compressed when subjected to a compression force in an overall radial direction in relation to the longitudinal axis X.

Each absorption means 304, 404 is also fastened to the bars 181 using fastening means 306, 406.

If a piece of debris reaches the turbine 160, it hits the protection plate 302, which is deformed by the impact to absorb part of the kinetic energy from the debris. Each absorption means 304, 404 can then be compressed to absorb even more kinetic energy from the debris to block it before it reaches the bypass pipe 182.

Furthermore, the position of the protection plate 302 and of each absorption means 304, 404 inside the bars 181 enables the protection plate 302 and each absorption means 304, 404 to remain pressed against the bars 181 when a piece of debris reaches the turbine 160, thereby obviating the risk of them being torn off.

Therefore, unlike in the prior art, the bypass pipe 182 is protected from any debris coming from a blade 161.

In the embodiment of the invention shown in FIG. 3, there is just one absorption means 304 sandwiched between the protection plate 302 and the bars 181 to which the protection plate 302 and the absorption means 304 are fastened.

There is therefore a single absorption means 304 that in this case takes the form of a plate between the protection plate 302 and the bars 181.

Each fastening means 306 in this case takes the form of a collar that is placed about the bar 181 and fastened to the absorption means 304 and to the protection plate 302 by securing means such as screws 308a-b.

At the top of FIG. 3, each screw 308a is screwed through the absorption means 304 and the protection plate 302 to fasten them.

At the bottom of FIG. 3, each screw 308b is only screwed through the absorption means 304 and the protection plate 302 is fastened to the absorption means 304 by any other means, such as adhesive or rivets.

Each fastening means 306 can therefore be fastened to the protection plate 302 directly or indirectly.

In the embodiment of the invention shown in FIG. 4, there is a separate absorption means 404 for each fastening means 406 and each absorption means 404 is sandwiched between the protection plate 302 and the bar 181 corresponding to the fastening means 406.

Each fastening means 406 in this case takes the form of a collar that is placed about the bar 181 and fastened to the absorption means 404 and to the protection plate 302 by securing means such as screws 408a-b.

As in FIG. 3, each fastening means 406 can be fastened to the protection plate 302 directly or indirectly. At the top of FIG. 4, each screw 408a is screwed through the absorption means 404 and the protection plate 302 to fasten them and, at the bottom of FIG. 4, each screw 408b is only screwed through the absorption means 404 and the protection plate 302 is fastened to the absorption means 404 by any other means, such as adhesive or rivets.

Figure 5:
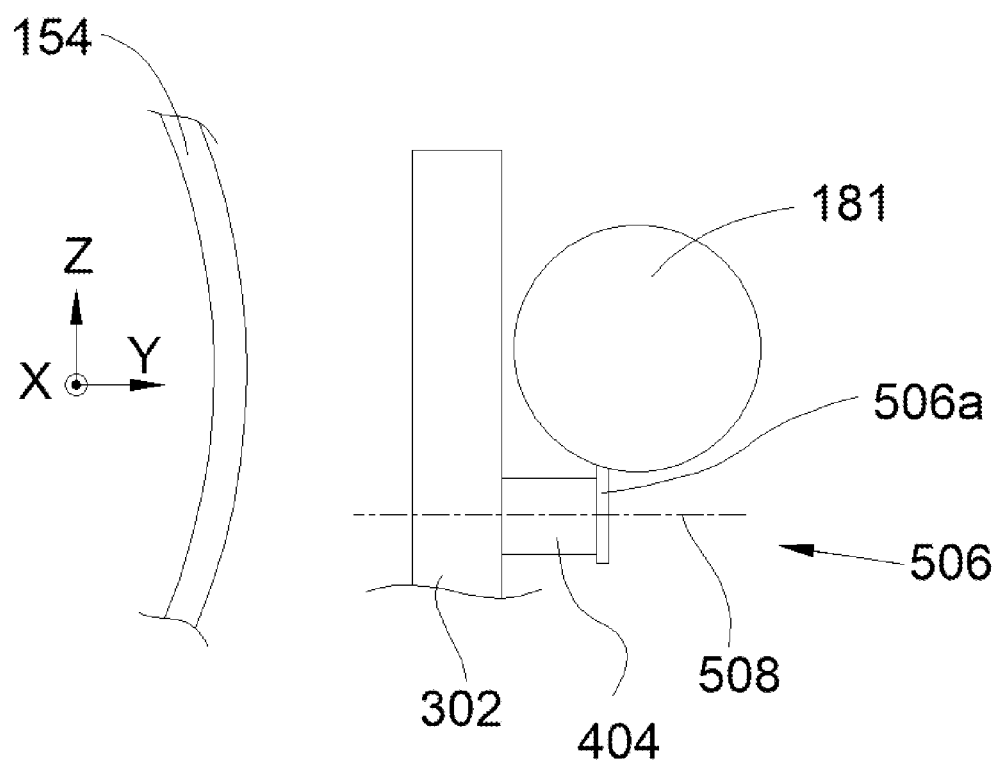
FIG. 5 is a variant embodiment of fastening means implemented in the invention.

FIG. 5 shows an alternative embodiment of the fastening means 506 that in this case take the form of a tab 506a rigidly connected to the bar 181, and to which the absorption means 404 is fastened by securing means such as a screw 508 through a bore in the tab 506a.

The protection plate 302 is for example made of a nickel alloy, stainless steel, a titanium alloy, etc., with a high specific strength, such as the alloy Ti-6Al-4V, and is for example around 30 mm thick.

The protection plate 302 is for example a stack of one or more metal plates (titanium, steel, aluminum, etc.) or composite plates (carbon, Kevlar, etc.) having different densities, which enables different levels of shock absorption on impact.

The absorption means 304, 404 is designed to have variable compression strength between the protection plate 302 and the bar 181, with a lower strength on the side facing the protection plate 302 and a higher strength on the side facing the bar 181 to gradually absorb the kinetic energy from the debris.

The variable compression strength of the absorption means 304, 404 can also be inverted, with the higher strength on the side facing the protection plate 302 and the lower strength on the side facing the bar 181.

The absorption means 304, 404 for example takes the form of a honeycomb structure.

In the embodiment shown in FIGS. 2 to 4, to improve the aerodynamics of the propulsion assembly 151, it has an outer cowl 206 fastened to the outside of the cowls 147 of the nacelle 149 covering the bypass pipe 182. The propulsion assembly 151 then has an air inlet 208 at the front of the outer cowl 206, between the latter and the cowls 147 of the nacelle 149 and an outlet 210 at the rear of the outer cowl 206, between the latter and the cowls 147 of the nacelle 149. Thus, the external air entering via the air inlet 208 carries any dihydrogen towards the air outlet 210 in the event of a leak.

In the embodiments in FIGS. 3 and 4, the cowl 147 of the nacelle 149 arranged alongside the bypass pipe 182 is replaced by an additional absorption means 310 that is fastened to the chassis 180 or to the neighboring cowls 147.

The additional absorption means 310 is for example the same shape as the absorption means 304 and 404, and has a lower compression strength on the side facing the inside of the nacelle 149 and a higher compression strength on the side facing the outside of the nacelle 149. As above, the inverse arrangement is possible, with a higher compression strength on the side facing the inside of the nacelle 149 and a lower compression strength on the side facing the outside of the nacelle 149.

The additional absorption means 310 can be a honeycomb structure, potentially with a variable density in the thickness.

To provide variable compression strength, the absorption means 304, 404 and the additional absorption means 310 may take other forms.

According to a specific embodiment, the absorption means 304, 404, 310 is made of a sandwich panel including a stack comprising successively an inner skin, a honeycomb structure, and an outer skin, in which the honeycomb structure may have a variable density in the thickness and in which the skins are metal plates (titanium, steel, aluminum, etc.) of equal or different thickness. According to one example embodiment, the inner skin is thicker than the outer skin, but the inverse is also possible. According to another example, the inner skin and the outer skin are equally thick.

According to another specific embodiment, the absorption means 304, 404, 310 is made of a sandwich panel including a stack comprising successively an inner skin, a honeycomb structure, an intermediate skin, a honeycomb structure, and an outer skin, in which the honeycomb structures may have different densities and thickness and in which the skins are metal plates of equal or different thickness.

The protection plate 302 may be a plate made by 3D printing to create a structure specifically designed for absorbing shocks. The protection plate 302 may be made of a stack comprising an inner skin, an inner structure and an outer skin, in which the skins are metal sheets of different thicknesses made of the same or different materials, and in which the inner structure is a pyramid structure of suitable shape.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A propulsion assembly for an aircraft comprising:
   a chassis comprising a cage formed by a grid of bars,
   a nacelle fastened to the chassis and formed by a plurality of cowls,
   a propulsion system seated in the nacelle and including a core enclosed in a casing and having a combustion chamber and a turbine provided with blades that are rotary about a longitudinal axis, a portion of the casing containing the turbine being seated in the cage,
   a supply pipe configured to convey dihydrogen, winding inside the nacelle as far as a rear of the turbine, and having a radial step that passes through one of the cowls to reach an outside of the nacelle,
   an injector rail seated in the nacelle, the injector rail fitted with injectors that enter the combustion chamber at a front of the turbine and having a radial step that passes through one of the cowls to reach the outside of the nacelle,
   a bypass pipe fluidically connected between the two radial steps and arranged outside the nacelle, and
   protection means comprising:
      a protection plate arranged inside the cage in relation to the bars and extending between the turbine and the bypass pipe,
      at least one fastening means provided to fasten the protection plate to a bar, and
      for each fastening means, an absorption means arranged between the protection plate and the respective bar.

2. The propulsion assembly according to claim 1, wherein the absorption means comprises a single plate between the protection plate and the bars.

3. The propulsion assembly according to claim 1, wherein there is a separate absorption means for each fastening means and wherein each absorption means is sandwiched between the protection plate and the bar corresponding to the fastening means.

4. The propulsion assembly according to claim 1, wherein each absorption means has a lower compression strength on a first side facing the protection plate and a higher compression strength on a second side facing the bar.

5. The propulsion assembly according to claim 1, further comprising:
   an additional absorption means provided alongside the bypass pipe that is fastened to the chassis or to a cowl.

6. The propulsion assembly according to claim 5, wherein the additional absorption means has a lower compression strength on a first side facing the inside of the nacelle and a higher compression strength on a second side facing the outside of the nacelle.

7. The propulsion assembly according to claim 1, further comprising:
   an outer cowl fastened to an outside of a cowl from the plurality of cowls covering the bypass pipe, and
   an air inlet at a front of the outer cowl, between the outer cowl and said cowl from the plurality of cowls, and an outlet at a rear of the outer cowl, between the outer cowl and said cowls of the nacelle.

8. An aircraft comprising:
   a wing,
   a dihydrogen tank, and
   at least one propulsion assembly according to claim 1, wherein the at least one propulsion assembly is fastened beneath the wing, and wherein the supply pipe is fluidically connected to the dihydrogen tank.

* * * * *